United States Patent [19]

Marsiglio et al.

[11] Patent Number: 4,788,600
[45] Date of Patent: Nov. 29, 1988

[54] VIDEO APPARATUS FOR GENERATING AN ADJUSTABLE CONTRAST VIDEO SIGNAL FROM A PHOTOGRAPHIC PRINT

[75] Inventors: Carl M. Marsiglio, Spencerport; James A. Reilich, Hilton, both of N.Y.

[73] Assignee: Eastman Kodak Company, Rochester, N.Y.

[21] Appl. No.: 38,391

[22] Filed: Apr. 15, 1987

[51] Int. Cl.⁴ .................. H04N 5/76; G03B 27/54
[52] U.S. Cl. ..................... 358/335; 358/906; 358/244; 353/121; 355/67; 355/70
[58] Field of Search .......... 358/244, 335, 906, 909, 358/345, 97, 160, 169, 209, 214, 215; 353/121; 354/354; 355/18, 67, 70

[56] References Cited

U.S. PATENT DOCUMENTS

| 2,783,678 | 3/1957 | Andreas . | |
| 3,119,301 | 1/1964 | Beattie et al. . | |
| 3,475,096 | 10/1969 | Ooue et al. | 355/70 |
| 3,480,365 | 11/1969 | Ooue et al. . | |
| 3,498,705 | 3/1970 | Ooue et al. | 353/121 X |
| 3,579,338 | 5/1971 | Ooue et al. | 355/70 X |
| 4,163,256 | 7/1979 | Adcock | 358/906 X |
| 4,537,500 | 8/1975 | Nemesniyik | 355/67 |
| 4,580,167 | 4/1986 | Diete | 358/169 |
| 4,591,918 | 5/1986 | Hisano | 358/209 X |
| 4,660,102 | 4/1987 | Kawakami et al. | 358/906 X |
| 4,691,253 | 9/1987 | Silver | 358/906 X |

Primary Examiner—Raymond F. Cardillo
Assistant Examiner—W. R. Young
Attorney, Agent, or Firm—David M. Woods

[57] ABSTRACT

A video transfer stand generates a video signal from a front-illuminated image on a semi-transparent or translucent original, especially a photographic print. The video system, including the transfer stand and a video display connected to the stand, produces output video contrast as a function of the transfer characteristic (gamma) of the video system as it interacts with the contrast exhibited by the reflection density of the print. This interaction produces high contrast that blocks out details especially in shadow areas of the video display. Such undesirably high contrast is moderated—releasing shadow detail—by variably backlighting the print in the transfer stand. The rear illumination, which is adjusted in view of the display, produces inherently lower contrast than the reflected illumination and, in combination therewith, optimizes the video display contrast.

4 Claims, 2 Drawing Sheets

VIDEO APPARATUS FOR GENERATING AN ADJUSTABLE CONTRAST VIDEO SIGNAL FROM A PHOTOGRAPHIC PRINT

BACKGROUND OF THE INVENTION

1. Field of the Invention

This invention pertains to the field of video recording and, in particular, to video apparatus and method for generating a video signal suitable for recording from an illuminated image on a photographic print or a similar form of original.

2. Brief Description of the Drawings

The concept of contrast, as known in the prior art, and the invention will be described in relation to the drawings, in which.

DESCRIPTION RELATIVE TO THE PRIOR ART

A video transfer stand using a television camera is a well-known video accessory for converting a printed image or artwork into a video signal. Since the original image is opaque as ordinarily viewed it is illuminated from the front with light that reflects from the original through the lens of the camera. The image light values are then processed by the signal processing electronics of the camera and delivered to external apparatus, such as a television monitor or a recorder.

Any component in such a video system can be assigned a value (referred to as gamma) to describe the shape of its response curve and its resulting contrast characteristic. While some components of the system, such as linear amplifiers, may not exaggerate light values, other components, particularly the picture display tube, will sharply expand the white level of the image due to the character of its response curve. At the same time, the relatively limited dynamic range of the camera excludes some of the imaged brightness gradations and therefore compresses or clips the darkest and/or lightest parts of the picture.

The net result is a reproduced picture having a "contrasty" look with bright, "washed-out" highlights and/or hidden shadow detail. The problem is compounded when imaging a relatively high contrast original, such as a photographic print. Indeed, the contrast of a video display (as reproduced, for example, from a recorded signal of a print) is often so high that picture detail is completely lost in the shadow areas. Such high contrast is a serious drawback to still reproduction under ordinary viewing conditions.

Figure 1:
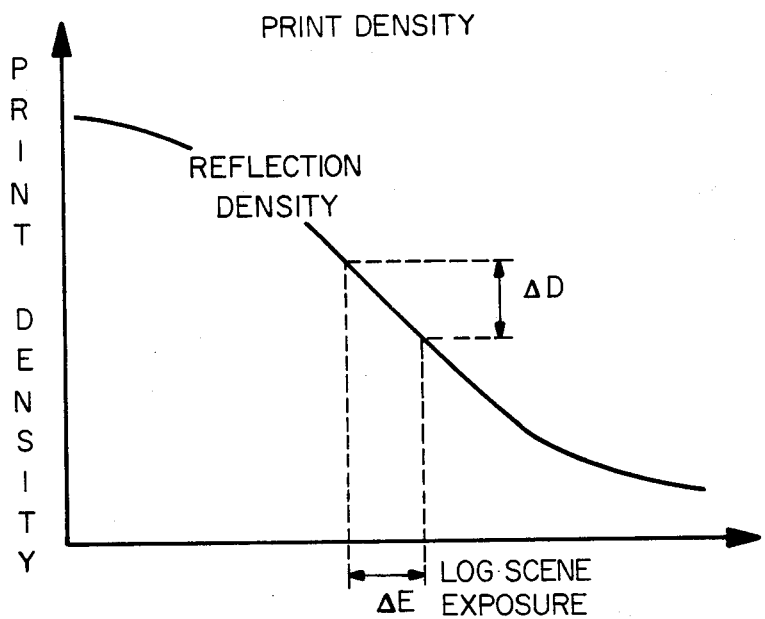
FIG. 1 is a graph that is useful in explaining the known effect of reflection density upon image contrast.

Though applied here in a video environment, contrast can be usefully analyzed in terms of its photographic analogue, especially if the original is itself a photographic print. Print density is a function of the exposure given to the print, or more specifically, the log of the exposure. This is shown in FIG. 1 by the well known "D-log E" curve. Contrast then becomes a measure of the change in density for a given change in exposure ($\Delta D/\Delta E$), that is, the slope of the "D-log E" curve. It is seen from FIG. 1 that a print already possesses a contrast level greater than 1, usually about 1.15, that tends to block, or hide, some shadow detail in the high density regions. By comparison, the processing and display circuits of a typical video system render a picture having even more contrast (typically about 1.25).

The problem is intensified because the video processing circuits effectively treat output contrast as the product of video contrast, i.e., their own inherent response characteristics, and the contrast of the original. While the goal of a video transfer system is at least not to worsen the inherent response seen in its output signal, the process of imaging a print yields a much higher output video contrast (for example, a contrast equivalent to $1.15 \times 1.25 = 1.44$). This level of contrast can be aesthetically displeasing as substantial information is lost in the shadow and/or highlight areas of a display.

SUMMARY OF THE INVENTION

Figure 2:
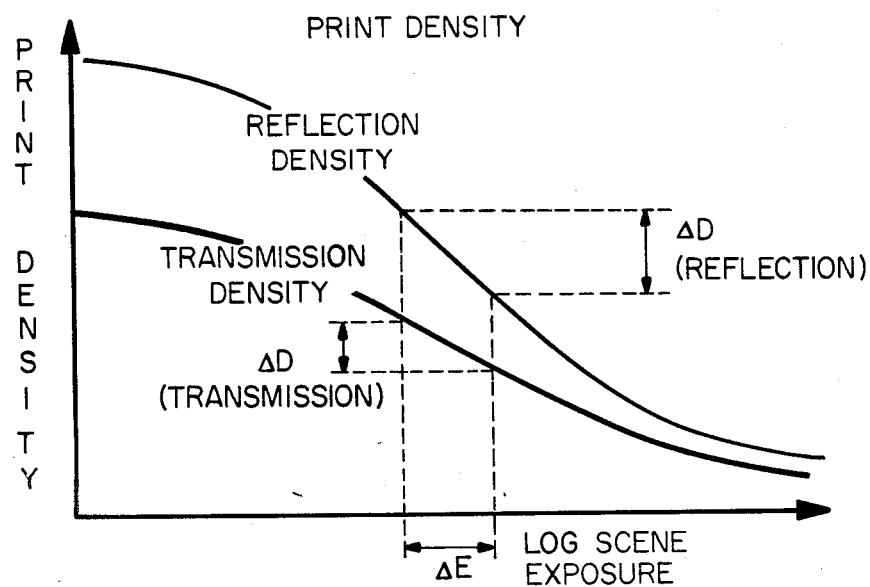
FIG. 2 is a graph that is useful in comparing the combined effect of transmission density and reflection density upon image contrast.

A solution to this problem is to reduce print contrast so that the combined effect of video and photographic print contrast is less detrimental to the final, reproduced picture. A couple of further insights are responsible for this invention. First, while a photographic-type original may appear to be opaque, it is actually semi-transparent or translucent to backlight illumination. More illumination would not seen to be the answer until, secondly, it is realized that the transmission transfer curve is substantially flatter than the reflection transfer curve. Transmission contrast, therefore, is less than reflection contrast. This relationship is seen in FIG. 2. Because transmission density is lower than reflection density for comparable exposures, it is feasible to moderate the effect of illumination of the print by backlighting the original. Ideally, net print contrast can be brought to near unity so that video contrast is unaffected by the original.

According to the invention, a video camera generates a video signal from the illuminated image on the face of a semi-transparent or translucent original, such as a photographic print. The video camera is part of a video system (including, for example, a display device) that increases the contrast of the original and especially blocks shadow detail. Two illuminating systems are provided: a first illuminating system frontally illuminates the face of the original, causing frontal illumination to reflect to the video camera. A second illuminating system illuminates the rear of the original, and the rear illumination is transmitted at least in part through the semi-transparent original to the camera.

Since transmission illumination inherently provides lower contrast than reflection illumination, the combination coacts to moderate the harshness of solely frontal illumination. Means are provided for adjusting the illuminating level of the second illuminating system to vary the relative combination of rear and frontal illumination so as to optimize the contrast exhibited by the illumination directed to the camera. This optimization is ordinarily done in connection with a video display, which directly shows the effect of varying the rear illumination.

DESCRIPTION OF A PREFERRED EMBODIMENT

Figure 3:
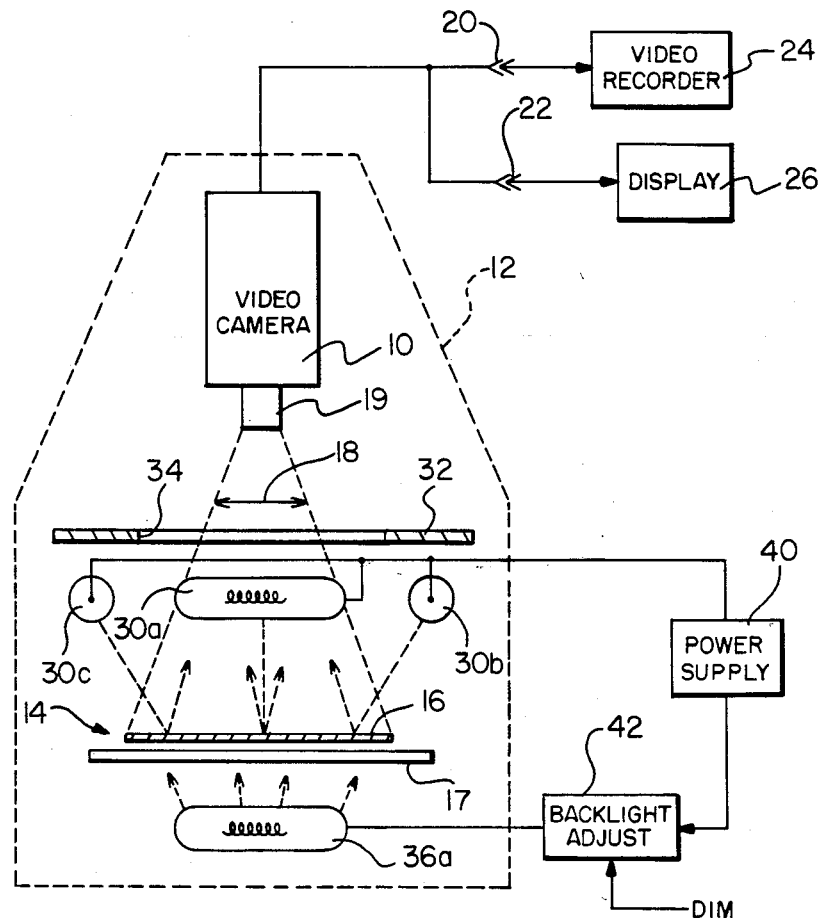
FIG. 3 is a schematic view of a video transfer stand showing a print stage having variable contrast control according to the invention.

Referring to FIG. 3, a video transfer stand is shown having a self-contained video camera 10 mounted on a stand 12 (shown by broken line) in spaced relation with respect to a print stage 14. A reflection original 16, such as a photographic print, is positioned on a platen 17 in the print stage 14 so as to be within a field of view 18 of a lens 19 of the camera 10. The platen 17, for reasons of this invention, is composed of a translucent, light-diffusing material. The video output of the camera terminates in two connectors 20 and 22, which respectively connect to a video recorder 24 and a video display device 26. (While the recorder 24 and display device 26 are shown separable from the video transfer stand, an alternative design could clearly incorporate them as part of the transfer stand.)

Figure 4:
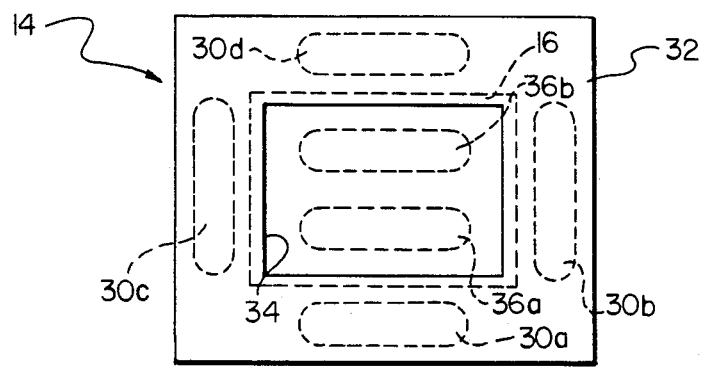
FIG. 4 is a plan view of the print stage of FIG. 3 showing the relative orientation of the components of the illuminating system.

The print stage 14 of the video transfer stand uses a combination of reflected (front) and transmitted (rear) illumination. The reflected (front) illumination is provided by a group of four fluorescent lamps 30a, 30b, 30c and 30d. (The orientation of the four front lamps is best shown in relation to the original 16 in the plan view of the print stage 14 in FIG. 4). A plate 32 is interposed between the four front lamps 30a–30d to prevent direct rays from entering the lens 19 of the video camera 10. An opening 34 in the plate 32, as shown also in FIG. 4, permits an unobstructed view of the original 16 by the camera 10. Transmitted (rear) illumination is provided by a pair of incandescent lamps 36a and 36b. Their orientation relative to the original 16 is also shown by FIG. 4.

According to the preferred embodiment, the illumination level of the four lamps 30a–30d is fixed while the illumination level of the rear lamps 36a and 36b is adjustable. A power supply 40 is connected to the front lamps 30a–30d to provide constant illumination and to the rear lamps 36a and 36b via a backlight adjuster 42. The backlight adjuster 42 may take any suitable conventional form, such as a dimer switch connected to a rheostat. As shown by FIG. 2, the front illumination exhibits the effect of reflection density, which inherently possesses a relatively high contrast. On the other hand, the rear illumination that passes through the semi-transparent original exhibits the effect of transmission density, which provides a lower contrast. Thus the combination of front and rear illumination provides a density-log exposure transfer characteristic somewhere between reflection density and transmission density. Accordingly, the contrast of such a combination is reduced from that accorded to reflection density alone.

In operation of the video transfer stand, the display device 26 is ordinarily connected to the video camera 10 so that adjustment of the backlight adjuster 42 results in readily perceived changes in the video display contrast. The correct backlight level, and therefore the optimum transfer characteristic as expressed by FIG. 2, is an empirical determination made in reference to the appearance of detail, usually in the shadows. In other words, a compromise between highlight and shadow detail will be quickly determined. then the picture is recorded on the video recorder 24 (which, incidentally, can be any conventional tape or disk recorder suitable for still recording).

The invention has been described in detail with particular reference to a presently preferred embodiment thereof, but it will be understood that variations and modifications can be effected within the spirit and scope of the invention. For example, the illumination level of the front lamps 30a–30d could also be adjustable. Furthermore, the particular orientation of the front and rear lamps as shown by FIG. 4 may be modified as necessary or desirable; likewise, the numbers of lamps (four front lamp and two rear lamps) is only exemplary of this embodiment and other groupings are likely to be effective. The rear lamps 36a and 36b are incandescent for ease of control although other types of lamps may work adequately. Finally, while contrast control as practiced according to the invention is useful with a photographic print, it is also useful with any semi-transparent or translucent original, for example, any graphic representation or artwork having a one-sided image. The success of the invention with an original having an image on both sides will vary depending upon the nature of the "unwanted" rear image through which light will be transmitted.

What is claimed is:

1. Video imaging apparatus for generating a video signal from an image of the illuminated face of a photographic print, said apparatus comprising:
   a video camera for generating the video signal from the image;
   a translucent, light-diffusing platen for supporting the print in the field of view of said video camera;
   first illuminating means interposed between said camera and said platen for frontally illuminating the print, sid first illuminating means including a plurality of lamps positioned outside of the field of view of said video camera for illuminating the print from at least two sides thereof;
   an opaque plate interposed between said plurality of lamps and said video camera for preventing direct rays from said lamps from reaching said video camera, said plate having an opening that allows frontal illumination reflected from the face of the print to reach said video camera;
   second illuminating means for illuminating the rear of the print through said translucent, light-diffusing platen, said rear illumination being transmitted at least in part through the photographic print and the opening in said plate to said video camera; and
   means for adjusting the illuminating level of said second illuminating means in order to vary the relative combination of transmitted and reflected illumination directed to said video camera thereby controlling the contrast of the video signal.

2. Apparatus as claimed in claim 1 further including a video display device connected to said video camera and wherein the effect of said adjusting means is rendered visible in a displayed video picture.

3. Apparatus as claimed in claim 1 further including a video recording device connected to said video camera for recording the video signal subsequent to adjustment by said adjusting means.

4. A method employing a video imaging device for generating a video signal from an image on a photographic print, said method comprising the steps of:
   positioning the print in the field of view of the video imaging device;
   illuminating the image on the print with illumination that reflects from the face of the print to the imaging device;
   backlighting the rear of the print with rear illumination that transmits at least in part through the print to the imaging device;
   displaying the image on a video display connected to the imaging device;
   adjusting the rear illumination for a preferred rendition of contrast in the video display image; and
   recording the output of the imaging device after said step of rear illumination adjustment is completed.

* * * * *